(12) United States Patent
Gao

(10) Patent No.: US 12,444,252 B2
(45) Date of Patent: Oct. 14, 2025

(54) METHOD FOR DISPLAYING DATA

(71) Applicant: XIAOMI EV TECHNOLOGY CO., LTD., Beijing (CN)

(72) Inventor: Yi Gao, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 18/239,971

(22) Filed: Aug. 30, 2023

(65) Prior Publication Data

US 2024/0386760 A1 Nov. 21, 2024

(30) Foreign Application Priority Data

May 18, 2023 (CN) .......................... 202310567842.4

(51) Int. Cl.
*G07C 5/08* (2006.01)
(52) U.S. Cl.
CPC .................................. *G07C 5/0825* (2013.01)
(58) Field of Classification Search
CPC .......... B60K 2360/167; B60K 2360/18; B60K 2360/186; B60K 35/00; B60K 35/81; B60K 35/28; G09G 2300/023; G09G 2330/08; G09G 2330/10; G09G 2330/12; G09G 2380/10; G06F 3/14; G07C 5/0825
See application file for complete search history.

(56) References Cited

U.S. PATENT DOCUMENTS

| 10,308,117 | B2 | 6/2019 | Kim et al. | |
| 2018/0208060 | A1* | 7/2018 | Kim | ...................... B60K 35/29 |
| 2020/0019431 | A1* | 1/2020 | Kim | ...................... G06F 3/1454 |
| 2023/0021380 | A1* | 1/2023 | Ono | ........................ G06F 11/07 |

FOREIGN PATENT DOCUMENTS

CN         116055653 A        5/2023

OTHER PUBLICATIONS

European Patent Application No. 23195807.5, Search and Opinion dated Jun. 3, 2024, 8 pages.
Chinese Patent Application No. 202310567842.4, Office Action dated Jun. 30, 2023, 8 pages.
Chinese Patent Application No. 202310567842.4, English translation of Office Action dated Jun. 30, 2023, 8 pages.

* cited by examiner

*Primary Examiner* — Sisay Yacob
(74) *Attorney, Agent, or Firm* — Cozen O'Connor

(57) ABSTRACT

A method for displaying data is performed by a vehicle including a first operating system and a second operating system, and includes: acquiring operating condition information of the vehicle; displaying the operating condition information in a first display mode by the first operating system and displaying the operating condition information in a second display mode by the second operating system, wherein data displayed in the first display mode is configured to cover data displayed in the second display mode; displaying the operating condition information in the first display mode by the second operating system in response to determining that a failure happens in the operating condition information displayed in the first display mode by the first operating system.

20 Claims, 3 Drawing Sheets

METHOD FOR DISPLAYING DATA

CROSS-REFERENCE TO RELATED APPLICATIONS

This application is based upon and claims priority to Chinese Patent Application No. 202310567842.4, filed on May 18, 2023, the entire content of which is incorporated herein by reference for all purposes.

FIELD

The present disclosure relates to the field of automatic driving technology, and particularly to a method and an apparatus for displaying data, a vehicle, and a storage medium.

BACKGROUND

In an intelligent cabin, a center control screen is usually required to display vehicle information such as speed and gear, and alarm information such as alarm light and alarm text.

The existing display system commonly used in the related art often displays abnormally due to system failure, which may lead to poor user experience, and may even not be able to meet the requirements of the relevant regulations in the field of vehicle production.

SUMMARY

According to a first aspect of embodiments of the present disclosure, there is provided a method for displaying data. The method is performed by a vehicle including a first operating system and a second operating system, and includes: acquiring operating condition information of the vehicle; displaying the operating condition information in a first display mode by the first operating system and displaying the operating condition information in a second display mode by the second operating system, data displayed in the first display mode being configured to cover data displayed in the second display mode; displaying the operating condition information in the first display mode by the second operating system in response to determining that a failure happens in the operating condition information displayed in the first display mode by the first operating system.

According to a second aspect of embodiments of the present disclosure, there is provided a vehicle including: a first processor; a memory storing machine-readable instructions that, when executed by the first processor, cause the first processor to implement steps of the method according to the first aspect described above.

According to a third aspect of embodiments of the present disclosure, there is provided a non-transitory computer-readable storage medium having stored thereon computer program instructions that, when executed by a second processor, cause steps of the method according to the first aspect described above to be implemented.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
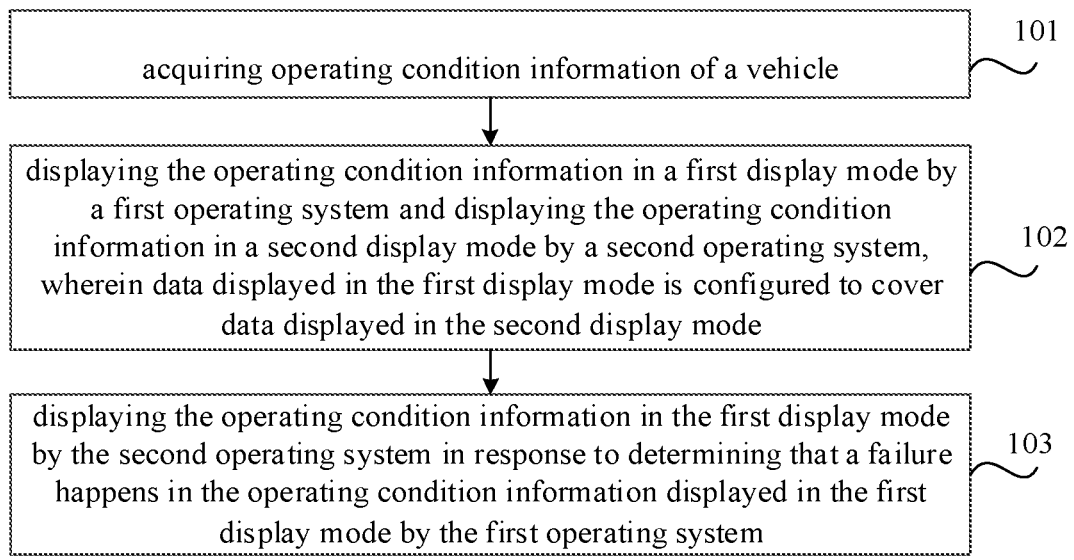
FIG. 1 is a flowchart of a method for displaying data according to some embodiments of the present disclosure.

Embodiments will be described in detail herein, examples of which are illustrated in the accompanying drawings. The same or similar elements and the elements having same or similar functions are denoted by same or similar reference numerals throughout the description. The embodiments described in the following description do not represent all embodiments in accordance with the present disclosure, and they are only examples of apparatuses and methods that are in accordance with aspects of the present disclosure as detailed in the appended claims.

It should be noted that all actions in the present disclosure to acquire signals, information or data are performed in compliance with data protection regulations and policies of the countries corresponding to positions where these actions performed, and authorized by the by the owners of the corresponding devices or apparatuses.

FIG. 1 is a flowchart of a method for displaying data according to some embodiments of the present disclosure. As shown in FIG. 1, the method is performed by a vehicle, and the vehicle includes a first operating system and a second operating system. The first and second operating systems may be any two existing systems such as Android, Linux, and QNX. The method for displaying the data includes the following operations.

In block 101, operating condition information of the vehicle is acquired.

The operating condition information may include one or more of speed information, gear information, alarm light(s) (e.g., a parking system failure alarm light, an antilock brake system (ABS) failure alarm light, an oil pressure indicator light, a steering assistance alarm light, or a tire pressure alarm light), and an alarm prompting text message (e.g., indicating that a battery temperature of the vehicle is too high, the speed of the vehicle is too fast, or a coolant temperature in an engine of the vehicle is too high).

In block 102, the operating condition information is displayed in a first display mode by the first operating system, the operating condition information is displayed in a second display mode by the second operating system, in which data displayed in the first display mode covers data displayed in the second display mode.

The first display mode is a dominant display and the second display method is a hidden display. The dominant display refers to that displayed data is able to be viewed by a user, and the hidden display refers to that displayed data is covered or blocked, and is unable to be viewed by the user.

In some embodiments, the step of block 102 is performed by displaying the operating condition information in a first layer by the first operating system, and displaying the operating condition information in a second layer by the second operating system, in which the first layer covers the second layer.

Figure 2:
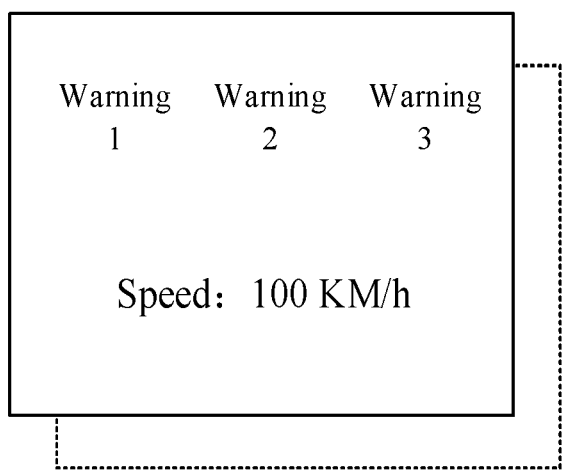
FIG. 2 is a schematic diagram of a method for displaying data according to some embodiments of the present disclosure.

For example, the first layer is a top layer of a display interface and the top layer is set as non-transparent, and the second layer is a layer other than the top layer. When the first layer is stacked on the second layer, the content displayed on the second layer is covered by the first layer, as shown in FIG. 2.

In other embodiments, the step of block 102 is performed by generating, by the first operating system, a first display interface having a first predetermined colour and including the operating condition information, and generating, by the second operating system, a second display interface having a second predetermined colour and including the operating condition information. The first display interface and the second display interface are overlapped, and the first predetermined colour is used to block the second predetermined colour.

For example, the first predetermined colour may be a dark colour such as black, dark brown or purple, and the second predetermined colour may be a light colour such as pink, white, light grey or yellow. For example, a colour of the first display interface (i.e., the first predetermined colour) may be black, and the colour of the second display interface (i.e., the second predetermined colour) may be pink. On this basis, the first display interface and the second display interface are displayed at the same time, but the colour of the second display interface is blocked by the first display interface of black. The colour of the second display interface may be formed by a combination of a variety of colours such as at least one of pink, white, light grey, and yellow. For example, a background colour of the second display interface is pink, text characters are white, and a frame is yellow. Correspondingly, in the case where the second display interface is formed by a plurality of colours, the first display interface may be formed by one colour (e.g., black), or it may be formed by a plurality of dark colours, e.g., red, purple, black and any combinations thereof.

In block 103, the operating condition information is displayed in the first display mode by the second operating system in response to determining that a failure happens in the operating condition information displayed in the first display mode by the first operating system.

In some embodiments, the step of determining that the failure happens in the operating condition information displayed in the first display mode by the first operating system includes: acquiring a display image of the first operating system; determining that no failure happens in the operating condition information displayed in the first display mode by the first operating system in response to determining that a displayed content in the display image is consistent with the operating condition information; and determining that the failure happens in the operating condition information displayed in the first display mode by the first operating system in response to determining that the displayed content in the display image is not consistent with the operating condition information.

It should be noted that the display image may be image data, generated by the first operating system, to be displayed on a display screen, for example, may be data to be displayed sent to the display screen by the first operating system. After acquiring the display image, a content displayed in the display image may be acquired by an image recognition technology.

In some other embodiments, the step of determining that the failure happens in the operating condition information displayed in the first display mode by the first operating system includes: determining that the failure happens in the operating condition information displayed in the first display mode by the first operating system in response to determining that a current running process in the first operating system is abnormal.

In addition, in some embodiments, displaying the operating condition information in the first display mode by the second operating system includes: stopping displaying the operating condition information in the first layer by the first operating system, and displaying the operating condition information in the first layer by the second operating system. In some other embodiments, displaying the operating condition information in the first display mode by the second operating system includes: stopping generating, by the first operating system, the first display interface having the first predetermined colour and including the operating condition information, and generating, by the second operating system, the first display interface having the first predetermined colour and including the operating condition information.

With the above technical solution of the present disclosure, the operating condition information may be displayed by the first operating system and the second operating system respectively, and when it is determined that the first operating system fails in displaying the operating condition information in the first display mode, the operating condition information is displayed in the first display mode by the second operating system, thus effectively guaranteeing the continuous display of the operating condition information, effectively improving the reliability of the display of the vehicle data, and improving the experience of the vehicle user.

Figure 3:
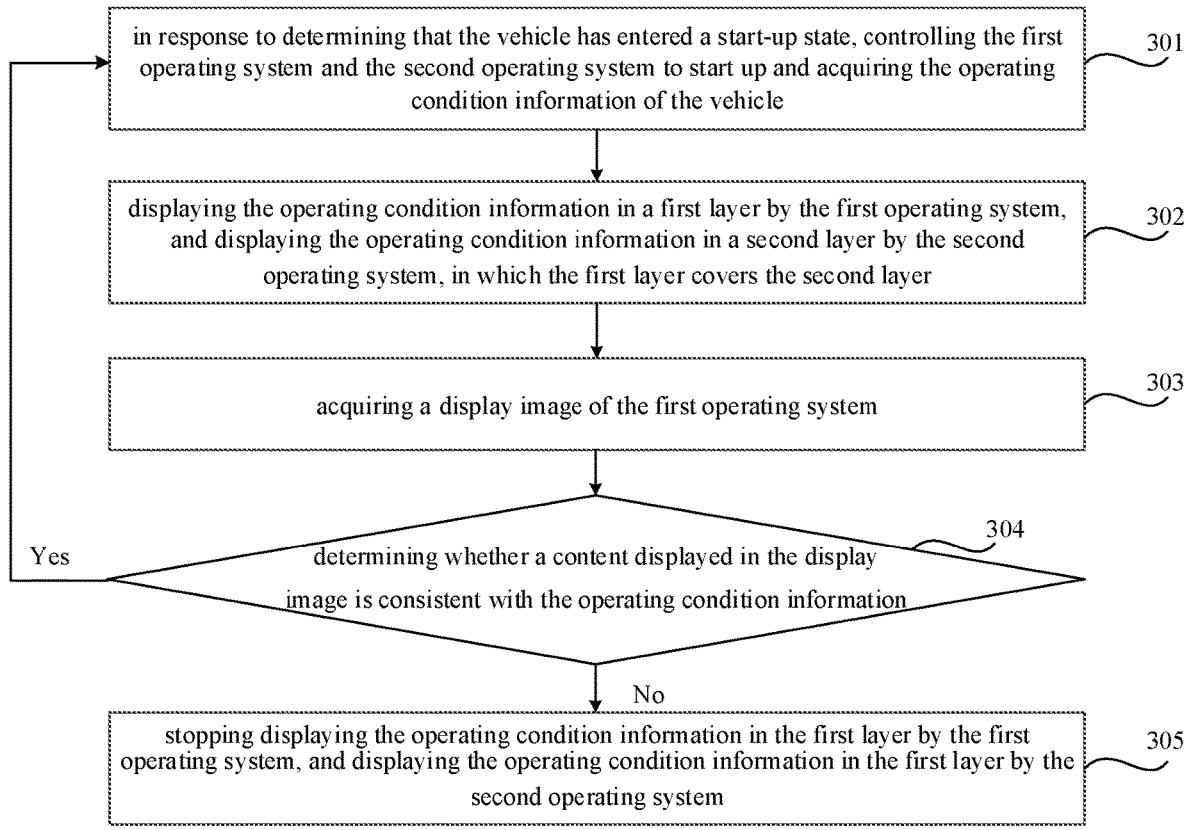
FIG. 3 is a flowchart of a method for displaying data according to some embodiments of the present disclosure.

FIG. 3 is a flowchart of a method for displaying data according to some embodiments of the present disclosure. As shown in FIG. 3, the method for displaying data includes the following steps.

In block 301, in response to determining that the vehicle has entered a start-up state, the first operating system and the second operating system are controlled to start up and the operating condition information of the vehicle is acquired.

The first and second operating systems may be any two existing systems such as Android, Linux, and QNX. The operating condition information may include one or more of speed information, gear information, alarm light(s) (e.g., a parking system failure alarm light, an ABS failure alarm light, an oil pressure indicator light, a steering assistance alarm light, or a tire pressure alarm light), and an alarm prompting text message (e.g., indicating that a battery temperature of the vehicle is too high, the speed of the vehicle is too fast, or a coolant temperature in an engine of the vehicle is too high).

In block 302, the operating condition information is displayed in a first layer by the first operating system; and the operating condition information is displayed in a second layer by the second operating system, in which the first layer covers the second layer.

For example, if the current speed of the vehicle is 100 km/h, the operating condition information displayed by this first operating system may be: vehicle speed 100 km/h, and if the vehicle is switched to P gear, a next frame of the display image output by the first operating system may include a prompt of P gear. When the vehicle speed of 100 km/h is displayed by the first operating system, the second operating system may display the vehicle speed 100 km/h on a layer (i.e., the second layer) other than the first layer (e.g., the uppermost layer). When the prompt of P gear is displayed by the first operating system, the second operating system may display, on the second layer (e.g., a layer other than the uppermost layer), the same information as the first operating system displays. For another example, when a failure happens to the parking system, the first operating system may display on the first layer the parking system failure alarm light, and the second operating system may display on the second layer the parking system failure alarm light.

In block 303, a display image of the first operating system is acquired.

In this step, data before display, i.e., data to be displayed sent to the display screen by the first operating system, may be acquired. After acquiring the display image, the operating condition information in the display image may be acquired by the image recognition technology.

In block 304, it is determined whether a content displayed in the display image is consistent with the operating condition information.

In a case where it is determined that the content displayed in the display image is consistent with the operating condition information, the process performs the step of block 301, and in a case where it is determined that the content displayed in the display image is not consistent with the operating condition information, the process performs a step of block 305.

In block 305, displaying the operating condition information in the first layer by the first operating system is stopped, and the operating condition information is displayed in the first layer by the second operating system.

With the above technical solution of the present disclosure, the operating condition information may be displayed by the first operating system and the second operating system respectively, and when it is determined that the first operating system fails in displaying the operating condition information in the first display mode, the operating condition information is displayed in the first display mode by the second operating system, thus effectively guaranteeing the continuous display of the operating condition information, improving the reliability of the display of the vehicle data, and improving the experience of the vehicle user.

Figure 4:
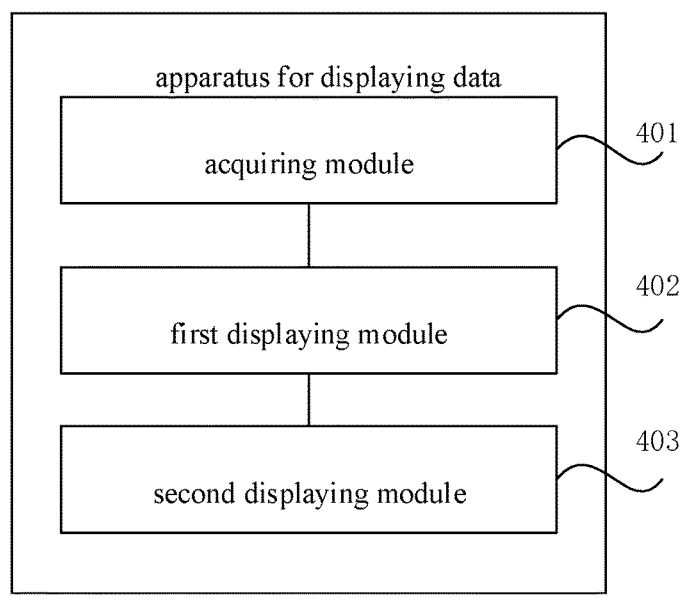
FIG. 4 is a block diagram of an apparatus for displaying data according to some embodiments of the present disclosure.

FIG. 4 is a block diagram of an apparatus for displaying data according to some embodiments of the present disclosure. As shown in FIG. 4, the apparatus is applied to a vehicle, and the vehicle includes a first operating system and a second operating system. The apparatus for displaying the data includes an acquiring module 401, a first display 402 and a second display 403. The acquiring module 401 is configured to acquire operating condition information of the vehicle. The first display 402 is configured to display the operating condition information in a first display mode by the first operating system and display the operating condition information in a second display mode by the second operating system. Data displayed in the first display mode covers data displayed in the second display mode. The second display 403 is configured to display the operating condition information in the first display mode by the second operating system in response to determining that a failure happens in the operating condition information displayed in the first display mode by the first operating system.

With the above technical solution of the present disclosure, the operating condition information may be displayed by the first operating system and the second operating system respectively, and when it is determined that the first operating system fails in displaying the operating condition information in the first display mode, the operating condition information is displayed in the first display mode by the second operating system, thus effectively guaranteeing the continuous display of the operating condition information, improving the reliability of the display of the vehicle data, and improving the experience of the vehicle user.

The first display 402 may be configured to display the operating condition information in a first layer by the first operating system; and display the operating condition information in a second layer by the second operating system, in which the first layer covers the second layer.

The second display 403 may be configured to stop displaying the operating condition information in the first layer by the first operating system, and display the operating condition information in the first layer by the second operating system.

The first display 402 may be configured to generate, by the first operating system, a first display interface having a first predetermined colour and including the operating condition information; and generate, by the second operating system, a second display interface having a second predetermined colour and including the operating condition information, in which the first predetermined colour is used to block the second predetermined colour.

The second display 403 may be configured to stop generating, by the first operating system, the first display interface having the first predetermined colour and including the operating condition information, and generate, by the second operating system, the first display interface having the first predetermined colour and including the operating condition information.

The second display 403 may be configured to acquire a display image of the first operating system; determine that no failure happens in the operating condition information displayed in the first display mode by the first operating system in response to determining that a content displayed in the display image is consistent with the operating condition information; and determine that the failure happens in the operating condition information displayed in the first display mode by the first operating system in response to determining that the content displayed in the display image is not consistent with the operating condition information.

The second display 403 may be configured to determine that the failure happens in the operating condition information displayed in the first display mode by the first operating system in response to determining that a current running process in the first operating system is abnormal.

The acquiring module 401 may be configured to, in response to determining that the vehicle has entered a start-up state, control the first operating system and the second operating system to start up and acquire the operating condition information of the vehicle.

With the above technical solution of the present disclosure, the operating condition information may be displayed by the first operating system and the second operating system respectively, and when it is determined that the first operating system fails in displaying the operating condition information in the first display mode, the operating condition information is displayed in the first display mode by the second operating system, thus effectively guaranteeing the continuous display of the operating condition information, improving the reliability of the display of the vehicle data, and improving the experience of the vehicle user.

With respect to the apparatus in the above embodiments, the specific manner in which each module performs an operation has been described in detail in the embodiments relating to the present method, and will not be described in detail herein.

The present disclosure further provides a non-transitory computer-readable storage medium having stored thereon computer program instructions (e.g., machine-readable instructions) that, when executed by a second processor, cause steps of the method provided by the present disclosure to be implemented.

Figure 5:
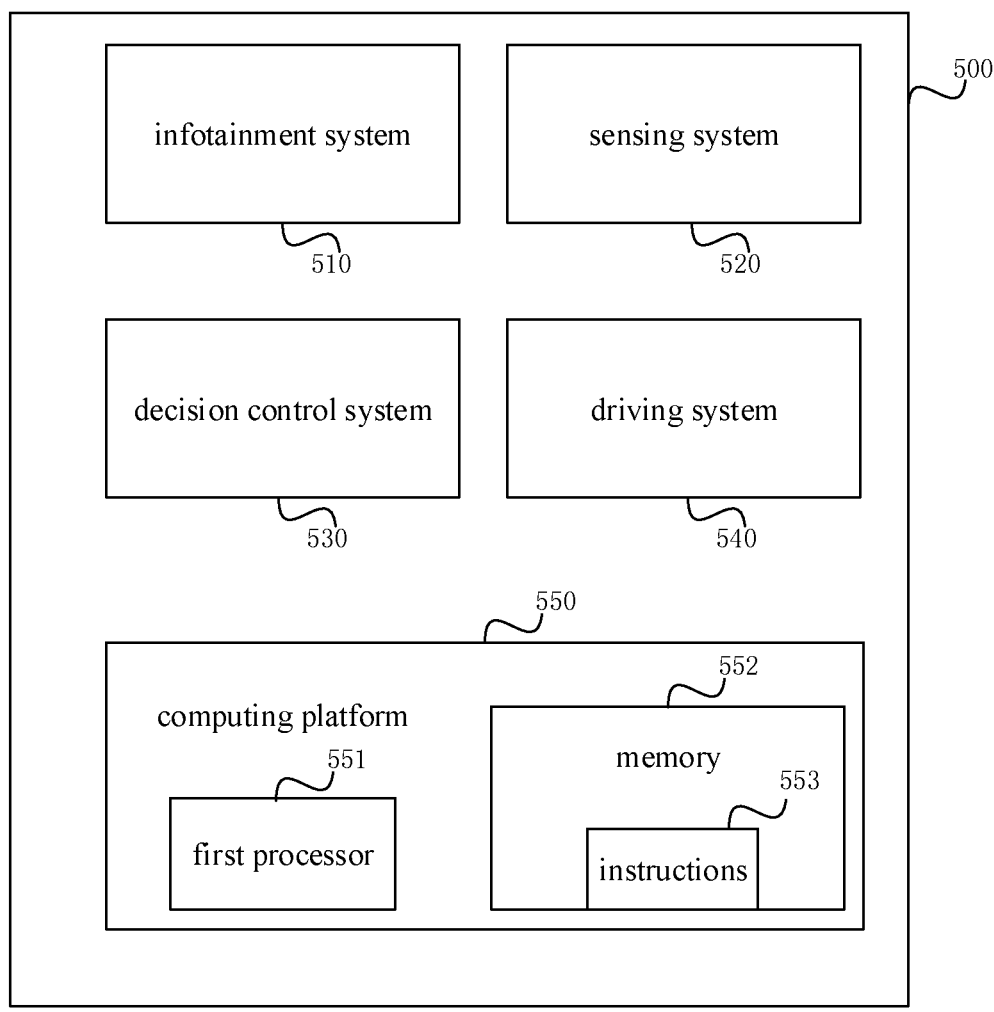
FIG. 5 is a block diagram of a vehicle according to some embodiments of the present disclosure.

FIG. 5 is a block diagram of a vehicle according to some embodiments of the present disclosure. For example, the vehicle 500 may be a hybrid vehicle, a non-hybrid vehicle, an electric vehicle, a fuel cell vehicle, or other types of vehicles. The vehicle 500 may be an autonomous vehicle, a semi-autonomous vehicle, or a non-autonomous vehicle.

Referring to FIG. 5, the vehicle 500 may include various subsystems such as an infotainment system 510, a sensing system 520, a decision control system 530, a driving system 540, and a computing platform 550. In addition, the vehicle 500 may include more or fewer subsystems, and each subsystem may include multiple components. Furthermore, the interconnection between each subsystem and each component of the vehicle 500 may be achieved through wired or wireless means.

In some embodiments, the infotainment system 510 may include a communication system, an entertainment system, and a navigation system.

The sensing system 520 may include multiple sensors for sensing information about the surrounding environment of the vehicle 500. For example, the sensing system 520 may include a positioning system (e.g., a global positioning system (GPS), a Beidou System or other positioning system), an inertial measurement unit (IMU), a lidar, a millimeter wave radar, an ultrasonic radar, and a camera.

The decision control system 530 may include a computing system, a vehicle controller, a steering system, an accelerator, and a braking system.

The driving system 540 may include components that provide power and motion to the vehicle 500. In an embodiment, the driving system 540 may include an engine, an energy source, a transmission system, and wheels. The engine may be selected from an internal combustion engine, an electric motor, an air pressure engine, and any combination thereof. The engine is configured to convert an energy provided by the energy source into a mechanical energy.

Some or all of the functions of the vehicle 500 are controlled by the computing platform 550. The computing platform 550 may include at least a first processor 551 and a memory 552, where the first processor 551 is configured to execute instructions 553 stored in the memory 552.

The first processor 551 may be any general-purpose processor, such as a commercially available CPU. The processor may further include other components such as a graphic process unit (GPU), a field programmable gate array (FPGA), a system on chip (SOC), an application specific integrated circuit (ASIC), or any combination thereof.

The memory 552 may be implemented by any type of volatile or non-volatile storage device or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic storage, a flash memory, a disk, or an optical disc.

In addition to the instructions 553, the memory 552 may further store data, such as road map(s), route information, and data about position, direction, and speed of the vehicle. The data stored in the memory 552 may be used by the computing platform 550.

In the embodiments of the present disclosure, the first processor 551 may execute instructions 553 to perform all or some of the steps of the methods described above.

Those skilled in the art will readily appreciate that various changes and modifications may be made to the embodiments described herein without departing from the scope of the present disclosure. The present disclosure is intended to cover any variations, uses, or adaptations of the present disclosure, which follow the general principle of the present disclosure and include conventional knowledge or common technology in the related art that are not disclosed in the present disclosure. The description and embodiments are provided only as examples, and the true scope and spirit of the present disclosure are indicated by the appended claims.

It should be understood that the present disclosure is not limited to the specific embodiments described above and shown in the drawings, and that various modifications and changes may be made without departing from the scope of the present disclosure as defined by the appended claims.

What is claimed is:

1. A method for displaying data, performed by a vehicle including a first operating system and a second operating system, comprising:
   acquiring operating condition information of the vehicle;
   displaying the operating condition information in a first display mode by the first operating system and displaying the operating condition information in a second display mode by the second operating system, wherein data displayed in the first display mode is configured to block data displayed in the second display mode; and
   displaying the operating condition information in the first display mode by the second operating system in response to determining that a failure happens in the operating condition information displayed in the first display mode by the first operating system;
   wherein displaying the operating condition information in the first display mode by the first operating system and displaying the operating condition information in the second display mode by the second operating system comprise:
   generating, by the first operating system, a first display interface having a first predetermined colour and comprising the operating condition information; and
   generating, by the second operating system, a second display interface having a second predetermined colour and comprising the operating condition information;
   wherein the first display interface and the second display interface are overlapped, and the first predetermined colour is used to block the second predetermined colour.

2. The method according to claim 1, wherein displaying the operating condition information in the first display mode by the first operating system and displaying the operating condition information in the second display mode by the second operating system comprise:
   displaying the operating condition information in a first layer by the first operating system; and
   displaying the operating condition information in a second layer by the second operating system;
   wherein the first layer covers the second layer.

3. The method according to claim 2, wherein displaying the operating condition information in the first display mode by the second operating system comprises:
   stopping displaying the operating condition information in the first layer by the first operating system, and
   displaying the operating condition information in the first layer by the second operating system.

4. The method according to claim 1, wherein displaying the operating condition information in the first display mode by the second operating system comprises:

stopping generating, by the first operating system, the first display interface having the first predetermined colour and comprising the operating condition information, and generating, by the second operating system, the first display interface having the first predetermined colour and comprising the operating condition information.

5. The method according to claim 1, wherein determining that the failure happens in the operating condition information displayed in the first display mode by the first operating system comprises:

acquiring a display image of the first operating system;

determining that no failure happens in the operating condition information displayed in the first display mode by the first operating system in response to determining that a content displayed in the display image is consistent with the operating condition information; and determining that the failure happens in the operating condition information displayed in the first display mode by the first operating system in response to determining that the content displayed in the display image is not consistent with the operating condition information.

6. The method according to claim 1, wherein determining that the failure happens in the operating condition information displayed in the first display mode by the first operating system comprises:

determining that the failure happens in the operating condition information displayed in the first display mode by the first operating system in response to determining that a current running process in the first operating system is abnormal.

7. The method according to claim 1, wherein acquiring the operating condition information of the vehicle comprises:

in response to determining that the vehicle has entered a start-up state, controlling the first operating system and the second operating system to start up and acquiring the operating condition information of the vehicle.

8. A vehicle, comprising:

a first processor;

a memory storing machine-readable instructions that, when executed by the first processor, cause the first processor to implement a method for displaying data by:

acquiring operating condition information of the vehicle;

displaying the operating condition information in a first display mode by a first operating system and displaying the operating condition information in a second display mode by a second operating system, wherein data displayed in the first display mode is configured to block data displayed in the second display mode; and displaying the operating condition information in the first display mode by the second operating system in response to determining that a failure happens in the operating condition information displayed in the first display mode by the first operating system;

wherein the first processor is further configured to:

generate, by the first operating system, a first display interface having a first predetermined colour and comprising the operating condition information; and generate, by the second operating system, a second display interface having a second predetermined colour and comprising the operating condition information, wherein the first display interface and the second display interface are overlapped, and the first predetermined colour is used to block the second predetermined colour.

9. The vehicle according to claim 8, wherein the first processor is further configured to:

display the operating condition information in a first layer by the first operating system; and display the operating condition information in a second layer by the second operating system, wherein the first layer covers the second layer.

10. The vehicle according to claim 9, wherein the first processor is further configured to:

stop displaying the operating condition information in the first layer by the first operating system, and display the operating condition information in the first layer by the second operating system.

11. The vehicle according to claim 8, wherein the first processor is further configured to:

stop generating, by the first operating system, the first display interface having the first predetermined colour and comprising the operating condition information, and generate, by the second operating system, the first display interface having the first predetermined colour and comprising the operating condition information.

12. The vehicle according to claim 8, wherein the first processor is further configured to:

acquire a display image of the first operating system;

determine that no failure happens in the operating condition information displayed in the first display mode by the first operating system in response to determining that a content displayed in the display image is consistent with the operating condition information; and determine that the failure happens in the operating condition information displayed in the first display mode by the first operating system in response to determining that the content displayed in the display image is not consistent with the operating condition information.

13. The vehicle according to claim 8, wherein the first processor is further configured to:

determine that the failure happens in the operating condition information displayed in the first display mode by the first operating system in response to determining that a current running process in the first operating system is abnormal.

14. The vehicle according to claim 8, wherein the first processor is further configured to:

in response to determining that the vehicle has entered a start-up state, control the first operating system and the second operating system to start up and acquire the operating condition information of the vehicle.

15. A non-transitory computer-readable storage medium having stored thereon computer program instructions that, when executed by a second processor, cause a method for displaying data to be implemented, wherein the method comprising:

acquiring operating condition information of a vehicle;

displaying the operating condition information in a first display mode by a first operating system and displaying the operating condition information in a second display mode by a second operating system, wherein data displayed in the first display mode is configured to cover-block data displayed in the second display mode; and displaying the operating condition information in the first display mode by the second operating system in response to determining that a failure happens in the operating condition information displayed in the first display mode by the first operating system;

wherein the second processor is further configured to:

generate, by the first operating system, a first display interface having a first predetermined colour and comprising the operating condition information; and generate, by the second operating system, a second display interface having a second predetermined colour and comprising the operating condition information, wherein the first display interface and the second display interface are overlapped, and the first predetermined colour is used to block the second predetermined colour.

16. The non-transitory computer-readable storage medium according to claim 15, wherein the second processor is further configured to:

display the operating condition information in a first layer by the first operating system; and display the operating condition information in a second layer by the second operating system, wherein the first layer covers the second layer.

17. The non-transitory computer-readable storage medium according to claim 16, wherein the second processor is further configured to:

stop displaying the operating condition information in the first layer by the first operating system, and display the operating condition information in the first layer by the second operating system.

18. The non-transitory computer-readable storage medium according to claim 15, wherein the second processor is further configured to:

stop generating, by the first operating system, the first display interface having the first predetermined colour and comprising the operating condition information, and generate, by the second operating system, the first display interface having the first predetermined colour and comprising the operating condition information.

19. The non-transitory computer-readable storage medium according to claim 15, wherein the second processor is further configured to:

acquire a display image of the first operating system;

determine that no failure happens in the operating condition information displayed in the first display mode by the first operating system in response to determining that a content displayed in the display image is consistent with the operating condition information; and determine that the failure happens in the operating condition information displayed in the first display mode by the first operating system in response to determining that the content displayed in the display image is not consistent with the operating condition information.

20. The non-transitory computer-readable storage medium according to claim 15, wherein the second processor is further configured to:

determine that the failure happens in the operating condition information displayed in the first display mode by the first operating system in response to determining that a current running process in the first operating system is abnormal.

* * * * *